(12) United States Patent
Blyumen

(10) Patent No.: US 10,235,989 B2
(45) Date of Patent: Mar. 19, 2019

(54) SONIFICATION OF WORDS AND PHRASES BY TEXT MINING BASED ON FREQUENCY OF OCCURRENCE

(71) Applicant: ORACLE INTERNATIONAL CORPORATION, Redwood Shores, CA (US)

(72) Inventor: Julia Blyumen, Scotts Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/265,836

(22) Filed: Sep. 14, 2016

(65) Prior Publication Data
US 2017/0278507 A1 Sep. 28, 2017

Related U.S. Application Data

(60) Provisional application No. 62/313,122, filed on Mar. 24, 2016.

(51) Int. Cl.
*G10L 13/033* (2013.01)
*G10L 13/08* (2013.01)
(Continued)

(52) U.S. Cl.
CPC ........ *G10L 13/10* (2013.01); *G06F 17/30663* (2013.01); *G06F 17/30684* (2013.01); *G10L 13/033* (2013.01); *G10L 2013/105* (2013.01)

(58) Field of Classification Search
CPC ....... G10L 13/00; G10L 13/033; G10L 13/08; G10L 13/10; G10L 21/0316;
(Continued)

(56) References Cited

U.S. PATENT DOCUMENTS 7,675,641 B2 * 3/2010 Cui .................. G10L 13/00
358/1.15
8,458,193 B1 6/2013 Procopio
(Continued)

OTHER PUBLICATIONS

Unknown Author, "Creating a Topic", The Topics Tab: Creating a Topic / Listen & Analyze / Knowledge Base Support, Published by Oracle Corporation, downloaded on May 13, 2016 from https://docs.oracle.com/cloud/social/doc.1/srm/vitrueanalytics/listencreatingatopic.html, 11 pages.
(Continued)

*Primary Examiner* — Martin Lerner
(74) *Attorney, Agent, or Firm* — Omkar K. Suryadevara; Silicon Valley Patent Group LLP

(57) ABSTRACT

A text mining tool is operated on a given text to obtain words and/or phrases ranked by frequency of occurrence. Thereafter, a text-to-speech converter is used to speak each word/phrase output by the text mining tool, and how loud each word/phrase is spoken depends on a corresponding frequency which is additionally output by the text mining tool, for each word/phrase. In certain embodiments, words/phrases are categorized into multiple themes by the text mining tool, and in these embodiments corresponding multiple voices and/or accents are used, to indicate via sonification, a specific theme of each word/phrase being spoken.

20 Claims, 15 Drawing Sheets

(51) Int. Cl.
*G10L 13/10* (2013.01)
*G06F 17/30* (2006.01)

(58) Field of Classification Search
CPC .............. G10L 21/0324; G06F 17/277; G06F 17/2775; G06F 17/2785
USPC ........ 704/258, 260, 266, 267, 269; 707/730, 707/739, 750, 776
See application file for complete search history.

(56) References Cited

U.S. PATENT DOCUMENTS

| | | | |
|---|---|---|---|
| 9,087,508 B1* | 7/2015 | Dzik | G10L 21/057 |
| 9,431,003 B1* | 8/2016 | Cecchi | G10L 13/033 |
| 9,575,936 B2* | 2/2017 | Romano | G06F 17/214 |
| 9,679,567 B2* | 6/2017 | Doyle | G10L 25/57 |
| 2002/0078030 A1 | 6/2002 | Iwayama | G06F 17/3061 |
| 2002/0198717 A1* | 12/2002 | Oudeyer | G10L 13/00 704/270 |
| 2006/0259481 A1* | 11/2006 | Handley | G06F 17/2785 |
| 2007/0260461 A1* | 11/2007 | Marple | G10L 13/10 704/260 |
| 2007/0276667 A1* | 11/2007 | Atkin | G10L 13/08 704/260 |
| 2008/0243510 A1* | 10/2008 | Smith | G10L 13/00 704/259 |
| 2009/0099846 A1* | 4/2009 | Pickering | G10L 13/08 704/260 |
| 2009/0204399 A1* | 8/2009 | Akamine | G10L 15/1822 704/235 |
| 2010/0207734 A1* | 8/2010 | Lai | G10L 13/00 704/272 |
| 2010/0250254 A1* | 9/2010 | Mizutani | G10L 13/07 704/260 |
| 2012/0078883 A1* | 3/2012 | Melby | G06F 17/3064 707/722 |
| 2012/0094259 A1* | 4/2012 | Lipsky | G09B 5/04 434/169 |
| 2014/0122073 A1* | 5/2014 | Goldstein | G10L 13/00 704/235 |
| 2014/0350930 A1* | 11/2014 | Cox | G10L 15/26 704/235 |
| 2015/0113410 A1 | 4/2015 | Bradley | |
| 2015/0186501 A1* | 7/2015 | Baluja | G06F 17/30958 707/750 |
| 2015/0371651 A1* | 12/2015 | Aharoni | G06F 17/2881 704/201 |
| 2016/0239483 A1* | 8/2016 | Bishop | G06F 17/2785 |

OTHER PUBLICATIONS

Unknown Author, "Social Station", SRM Knowledge Base documentation, Published by Oracle Corporation, downloaded on May 13, 2016 from https://docs.oracle.com/cloud/social/doc.1/srm/srmmain/socialstation.html, 8 pages.

Unknown Author, "Oracle Social Cloud Social Relationship Management", data sheet published by Oracle Corporation, 2014, 4 pages.

Unknown Author, "Strategy for Social Engagement & Monitoring: Transforming Noise to Signal" white paper Published by Oracle Corporation, Sep. 2012, 14 pages.

Unknown Author, "The Resources Tab: Intro" Published by Oracle Corporation, downloaded on May 13, 2016 from https://docs.oracle.com/cloud/social/doc.1/srm/vitrueanalytics/theresourcestabintro.html, 6 pages.

* cited by examiner

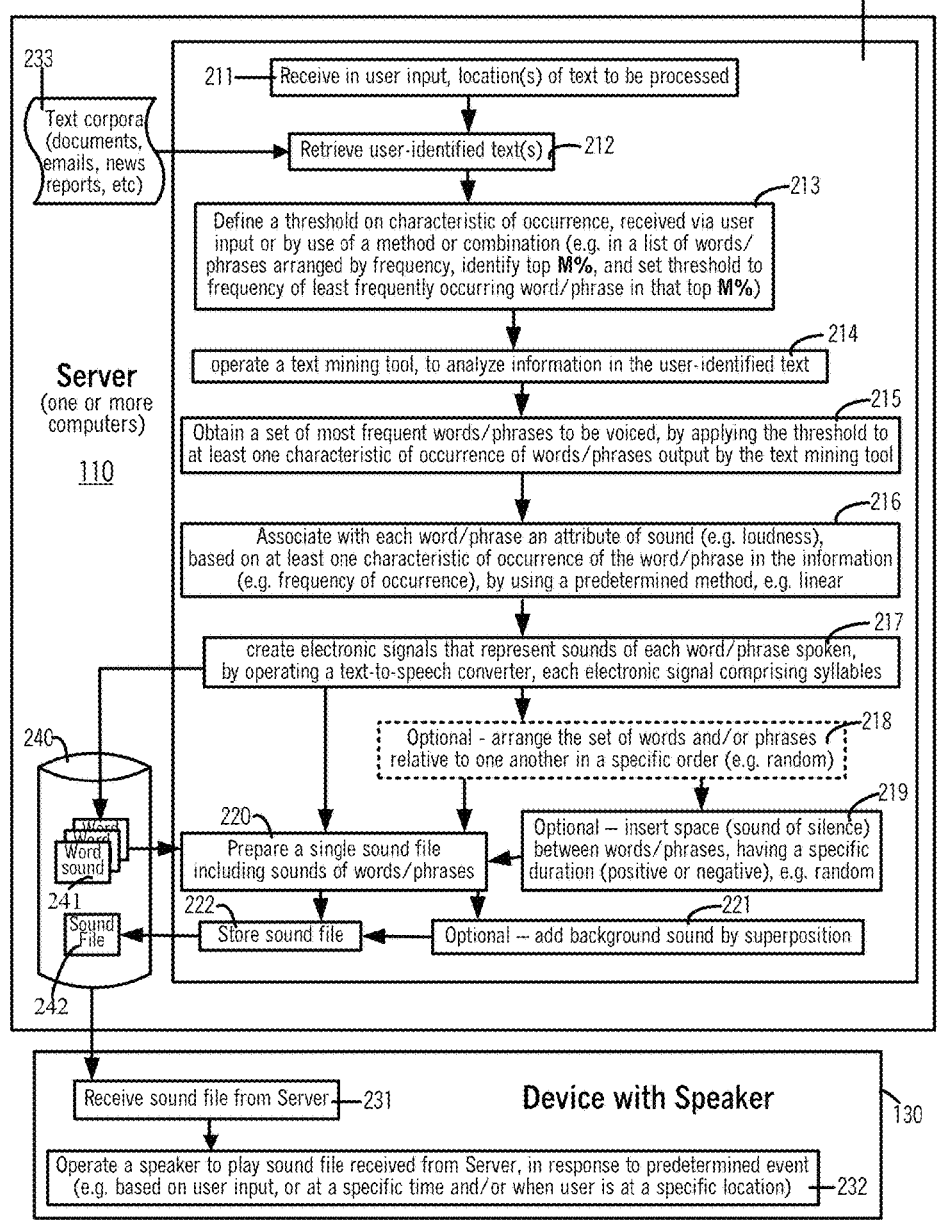

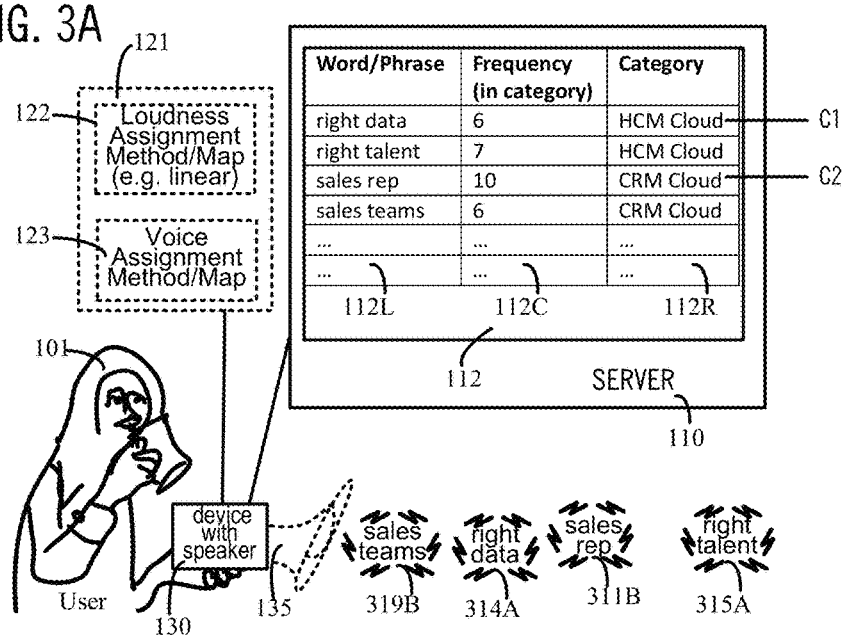
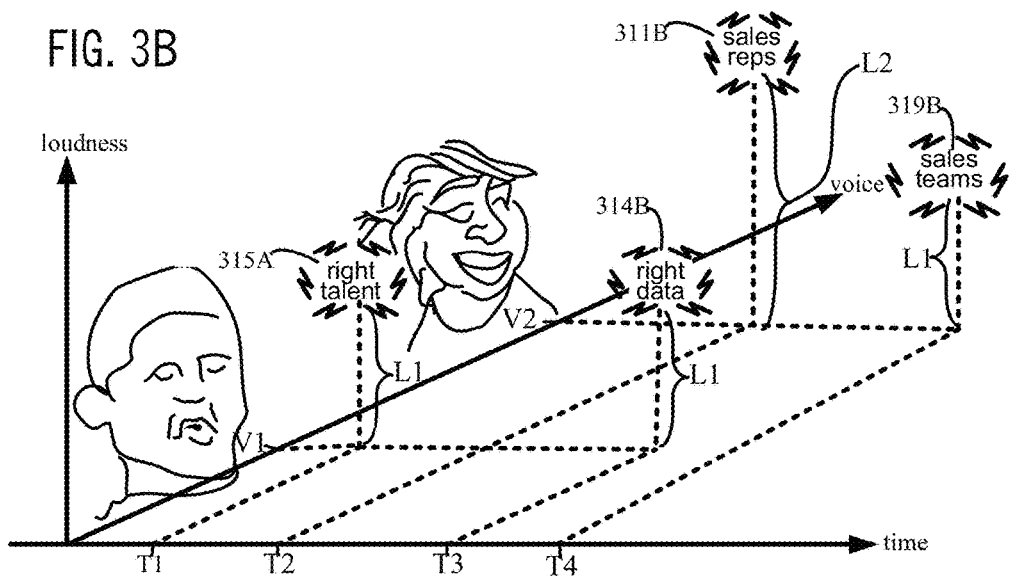

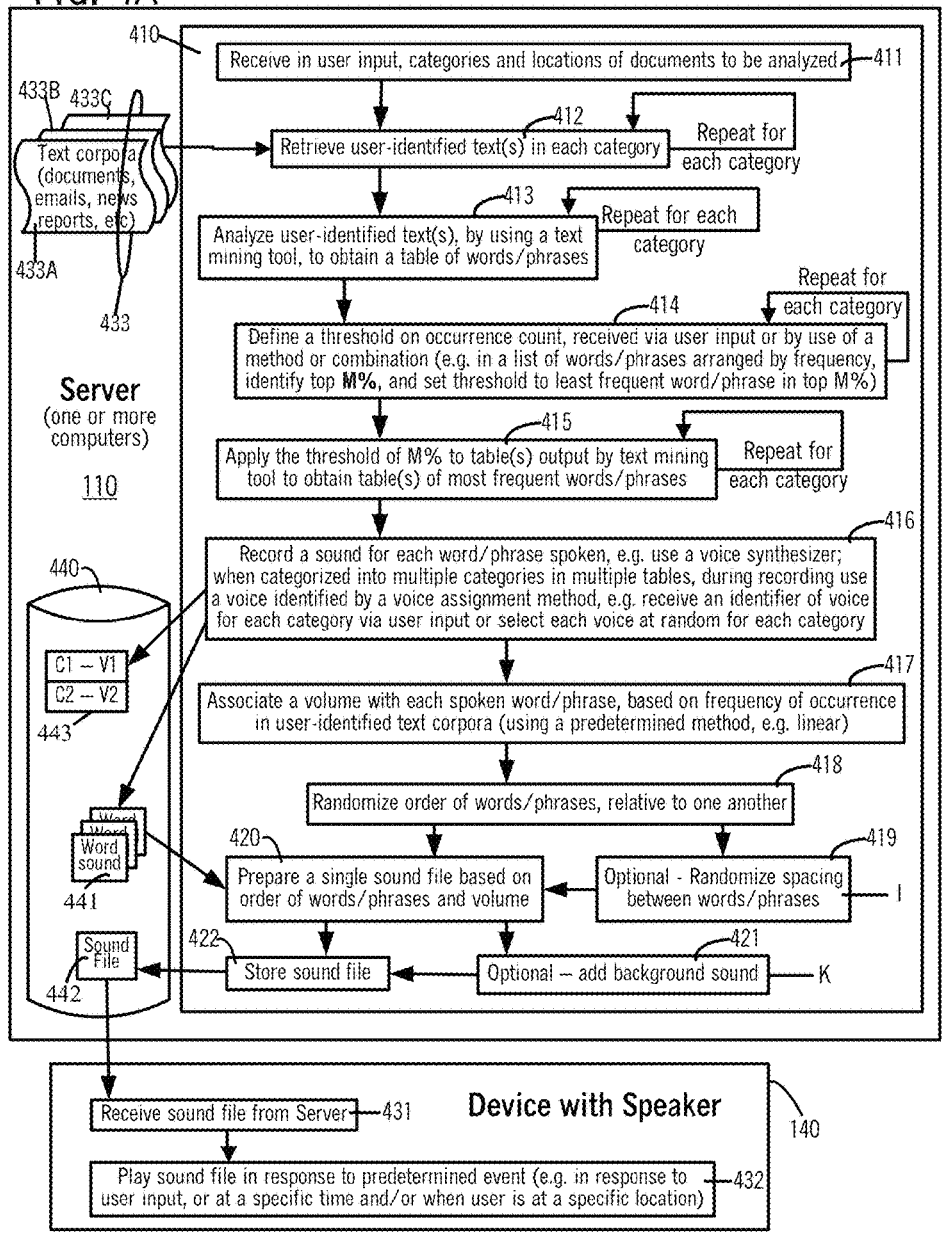

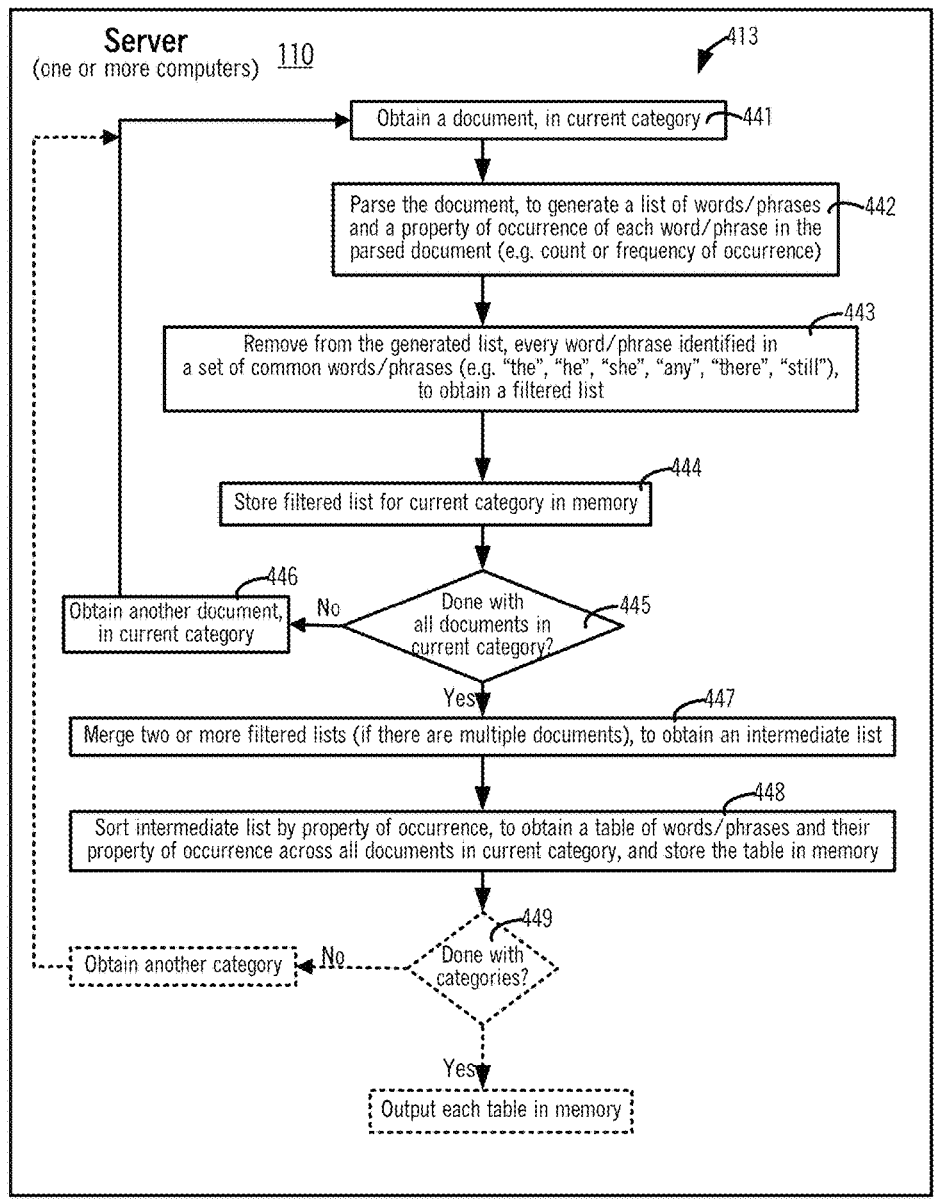

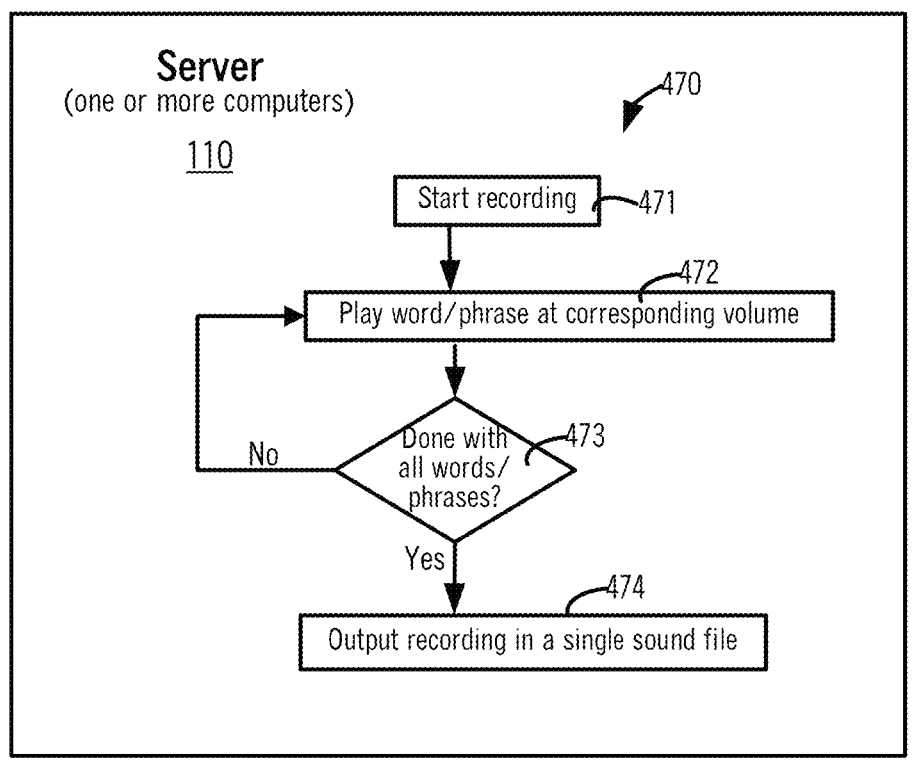

SONIFICATION OF WORDS AND PHRASES BY TEXT MINING BASED ON FREQUENCY OF OCCURRENCE

CROSS-REFERENCE TO PROVISIONAL APPLICATION

This patent application claims priority under 35 USC § 119 from U.S. Provisional Application 62/313,122 entitled "Sonification of Words and Phrases Identified by Analysis of Text" filed on Mar. 24, 2016, by Julia Blyumen which is hereby incorporated by reference herein in its entirety.

BACKGROUND

In the prior art, information may be displayed to a user in the form of a visualization called a text cloud (also called "word cloud") that shows words in different sizes (e.g. height and width), wherein the words' sizes depend on relative frequencies of words in a given text, as illustrated in FIG. 1. Text clouds of the prior art are normally rendered visually, on a display or screen of a computer (e.g. desktop PC, laptop PC, or smartphone).

The current inventor realizes that human-wearable devices, like smart watches, are too small to show a lot of information visually. Moreover, non-wearable devices, like smart appliances, have no visual display at all. The current inventor notes that simple sounds (e.g. beep) can be used by such devices, to communicate simple information, e.g. a microwave oven may emit a beeping sound as soon as cooking is completed. The current inventor believes there is a need for improvement in communicating complex multi-dimensional and analytical information via audio interfaces, as described below.

SUMMARY

In several described embodiments, a text mining tool implemented in one or more computer(s) is operated on information (e.g. in text form) to automatically obtain a set of words and/or phrases (e.g. two word combinations) occurring therein, which may be automatically selected based on a predetermined criterion, e.g. an ordered list of top ten most-frequently occurring words in a document. In addition to the set of words and/or phrases, a characteristic of occurrence (e.g. frequency) of each word or phrase in the information is also obtained from the text mining tool. Thereafter, a text-to-speech converter is used, to automatically create signals (e.g. in digital form) having different electrical characteristics (e.g. voltage and/or current) that represent sounds of a plurality of words and/or phrases in said set being spoken, in a form audible to ears of humans. Each signal representative of sound of a word/phrase is created by the text-to-speech converter, and has an attribute of the sound (e.g. loudness) that changes depending on the characteristic of occurrence (e.g. frequency) of each word or phrase in the information. At this stage, each signal created (in digital form) by the text-to-speech converter includes one or more syllables of speech.

In certain embodiments, the set of words/phrases identified by the text mining tool are categorized into multiple categories (e.g. by the text mining tool or based on user input), and in these embodiments a specific voice and/or accent is used in the signals being created, to indicate after text-to-speech conversion, a corresponding specific category of the word/phrase which is being converted into audio form (also called "sonification"). The signals may be processed further, e.g. sequenced randomly in time relative to one another, and/or separated in time by sound of silence between one another (to implement positive spacing between adjacent words/phrases), and/or superposed on one another at least partially in time so as to create a partial overlap there-between (to implement negative spacing between adjacent words/phrases), and/or superposed as a whole with a signal of background sound, such as music, and the resulting signal is stored in memory, in digital form of an audio file for download into a device which includes a speaker, and thereafter the audio file is played to a human user by operation of the speaker.

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 2C illustrates, in a flow chart, acts performed by one or more processors executing instructions in a text cloud sonification software 410 (FIG. 6C), in certain illustrative embodiments.

FIG. 3A illustrates, in certain embodiments in accordance with the invention, a device 130 (including speaker 135) which receives from a server 110, a table 112 that has the two columns of table 111 (as shown in FIG. 2A) and further includes a third column identifying a category of each word/phrase, wherein a voice which is used to speak each word/phrase by device 130 is determined by a voice assignment method (or map) 123.

FIG. 3B illustrates, in a graph, one voice V1 (e.g. of a male) using which sounds 315A and 314B are generated (both at loudness level L1), and another voice V2 (e.g. of a female) using which sounds 311B and 319B are generated (at loudness levels L2 and L1 respectively), by the device 130 of FIG. 2C.

FIG. 4A illustrates, in a high level flow chart, acts performed by one or more processors executing instructions in a text cloud sonification software 410 (FIG. 6C) in certain illustrative embodiments.

FIG. 4B illustrates, in an intermediate level flow chart, acts performed by one or more processors executing instructions to perform action 413 (FIG. 4A), in certain illustrative embodiments.

FIG. 4E illustrates, in an intermediate level flow chart, acts performed by one or more processors executing instructions to perform action 420 (FIG. 4A), in certain illustrative embodiments.

DETAILED DESCRIPTION

Figure 1:
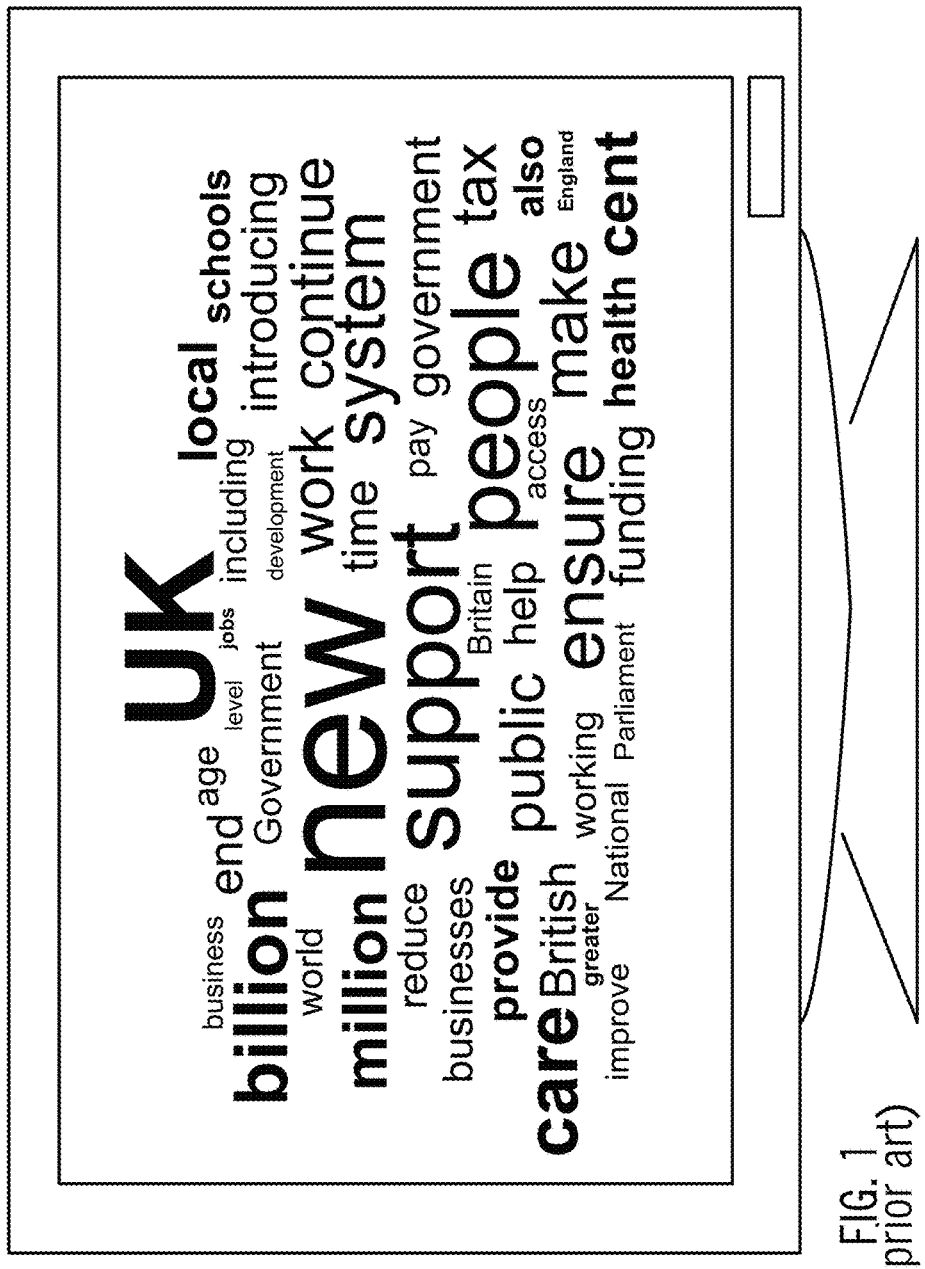
FIG. 1 illustrates a display or screen of a computer of the prior art, wherein a text cloud is rendered, showing words in different sizes depending on relative frequencies of the words in a given text.

Several described embodiments improve presentation of information to a user, by a device that has a speaker, such as device 120, by executing instructions in text cloud sonification software 410 (FIG. 2C) to perform a computer-implemented method as follows. Specifically, in act 211, server 110 receives in user input, location(s) of text in which words and phrases are to be sonified (or rendered into audio form) after analysis thereof.

Thereafter, in act 212, server 110 retrieves one or more user-identified text(s) 233 from an internal non-volatile storage device (e.g. hard disk) or from an external non-volatile storage device (e.g. accessible over a local area network or over the Internet). Examples of text(s) 233 that are retrieved, for use in being operated on by a text mining tool 660 (FIG. 6C), include documents retrieved from a user-specified directory in the user's PC, and/or user's emails, and/or news feeds to which the user has subscribed, etc. Also, depending on the embodiment, text(s) 233 may be retrieved in act 212 from any websites accessible over the Internet, such as social media websites, e.g. Facebook, Twitter, Instagram, etc. And, text(s) 233 may be retrieved in act 212 from any websites accessible over an intranet, e.g. reports stored on file server(s) of a corporation, which are accessible via a local area network (LAN).

In act 213, server 110 defines a threshold on a characteristic of occurrence, which may be defined, for example: (1) by receipt via user input, (2) by use of a predetermined method, or (3) by a combination thereof. In some examples described next, the characteristic of occurrence is frequency or count. In one such example, if top 10% of most frequent words have frequencies in between 1000 and 4000, the threshold may be set to 1000 (either automatically, or via user input). In examples of the type just described, instead of 10%, any M % may be used, with M received in user input in certain examples.

Subsequently, in act 214, server 110 operates a text mining tool 660 (which may be, for example, SRM Listen & Analyze Semantic API available from Oracle Corporation) to analyze the user-identified texts (i.e. the user-identified text(s) 233 retrieved in act 212). From among all words/phrases output by text mining tool 660, a predetermined criterion is used in some embodiments of server 110 to select words/phrases in act 215, for use in sonification. For example, most-frequently occurring 20% of the words/phrases in the user-identified text(s) 233 may be obtained in act 215.

Figure 2A:
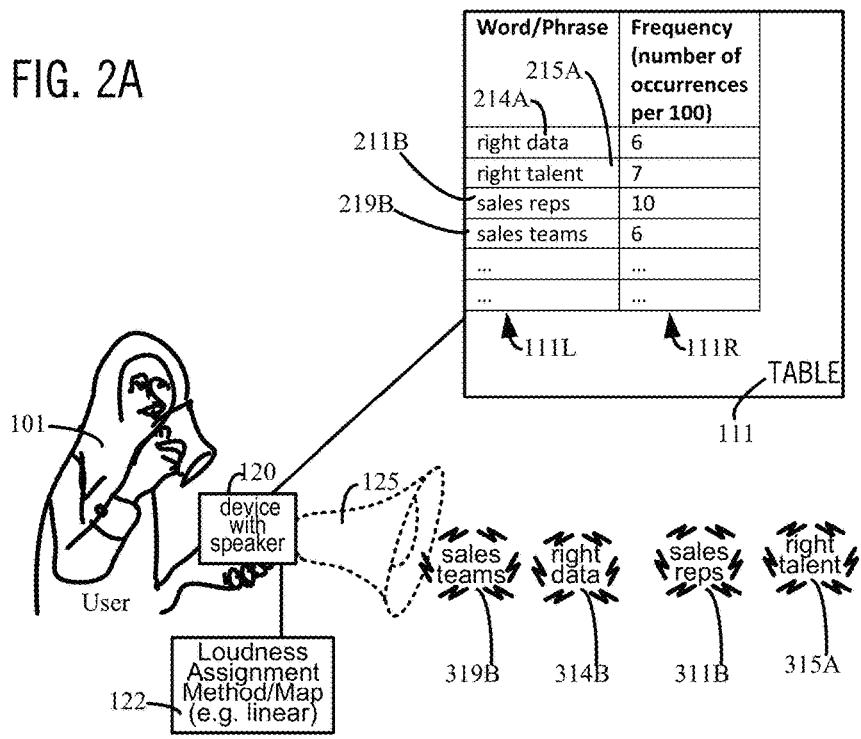
FIG. 2A illustrates, in some embodiments in accordance with the invention, a device 120 (including speaker 125) that generates sounds 315A, 311B, 314B, and 319B based on corresponding words 215A, 211B, 214A, and 219B in a table 111, with loudness of the generated sounds being determined by a loudness assignment method (or map) 122.

The words/phrases obtained in act 215 may be ranked by frequency, as illustrated in table 111 in FIG. 2A. The words and/or phrases may be selected based on a predetermined criterion, e.g. most-frequently occurring M % in a document or across a group of documents, wherein M may be user-specified and/or predetermined (e.g. hard coded). In the example of FIG. 2A, table 111 has two columns, wherein a first column contains a word/phrase and a second column contains frequency (which is a characteristic of occurrence of each word or phrase in the group of documents).

Then, in act 216, server 110 associates with each word/phrase to be vocalized (or sonified), an attribute of sound (e.g. volume) based on the characteristic of occurrence of the word or phrase (e.g. frequency or count), in the user-identified text(s) 233. Although in several embodiments, the attribute of sound is loudness or volume, in other embodiments the attribute of sound can be any other attribute, such as voice (or accent, or gender). Moreover, although in several embodiments, the characteristic of occurrence is frequency or count, in other embodiments the characteristic of occurrence can be any other characteristic, such as category. The specific manner in which the characteristic of occurrence of the word or phrase is associated with the attribute of sound depends on the embodiment, which can be, for example, linear or non-linear.

In one illustrative embodiment, a sound sampling rate is 480 kHz (which is the sample rate of most computer soundcards), and a comfortable sound level range is between a maximum sound level (e.g. 60 dB) and a minimum sound level (e.g. 10 dB). In this illustrative embodiment, a linear method implemented in act 216 assigns to each word, a specific volume (also called loudness level) between the maximum level and the minimum level, as a function of each word's frequency returned in the table 111 (FIG. 2A) output by performing acts 214 and 215. More specifically, the linear method maps the highest frequency or upper-most count (e.g. 11) to the maximum sound level (e.g. 60 dB), and maps the lowest frequency or lower-most count (e.g. 2) to the minimum sound level (e.g. 10 dB), and performs linear interpolation there-between. For example, a word at the highest frequency or upper-most count of 11 is assigned to 60 dB sound level, another word with the lowest frequency or lower-most count of 2 is assigned to 10 dB sound level, and yet another word with the middle frequency or middle count of 5 is assigned to the 27 dB sound level. For more information see "Audacity Manual: Digital Audio Fundamentals" and see US Department of Labor documentation.

Figure 5C:
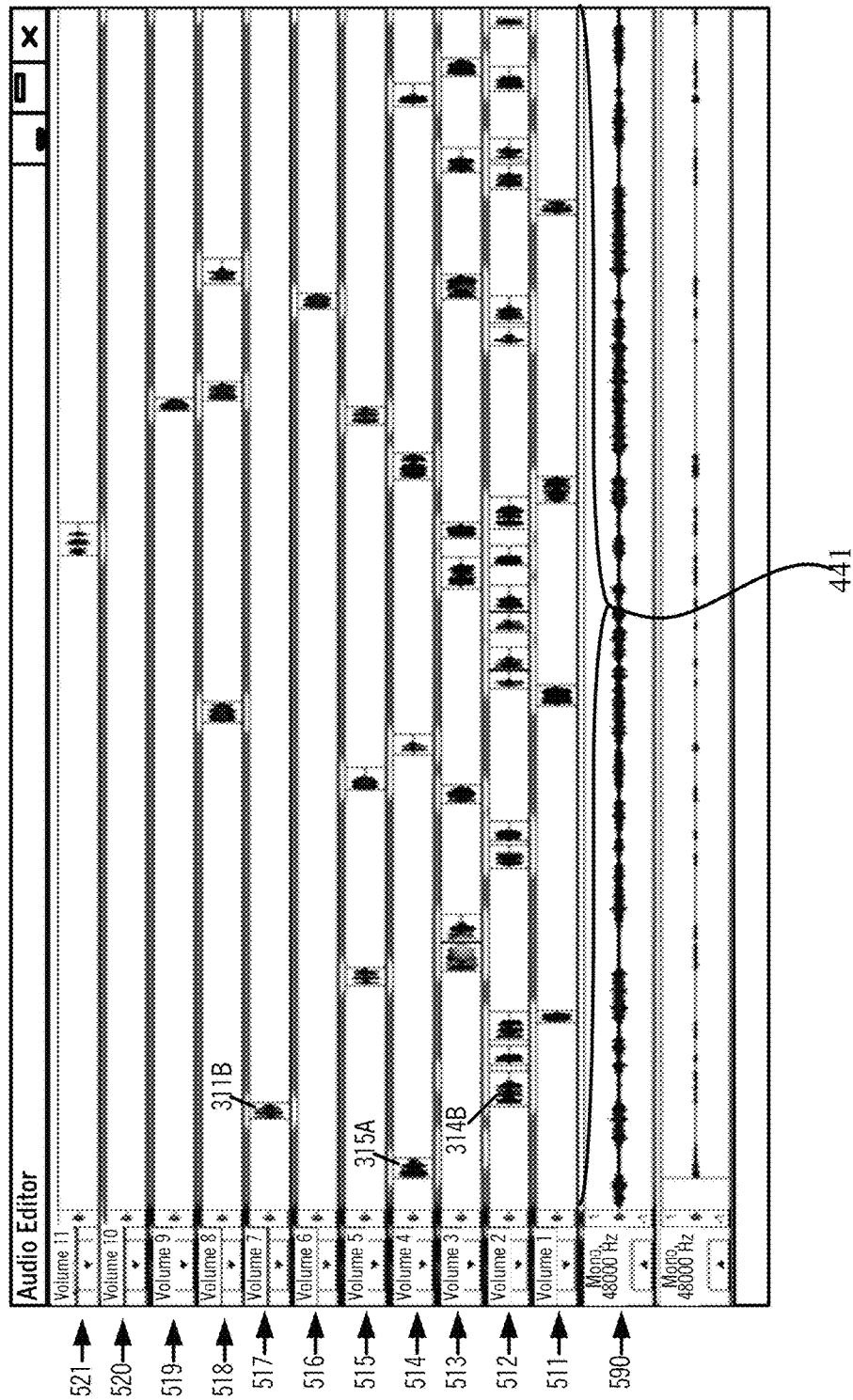
FIG. 5C illustrates use of an audio editor to combine sound recordings 441 of each word/phrase at a corresponding loudness level determined by loudness assignment method (or map) 122.
Figure 6A:
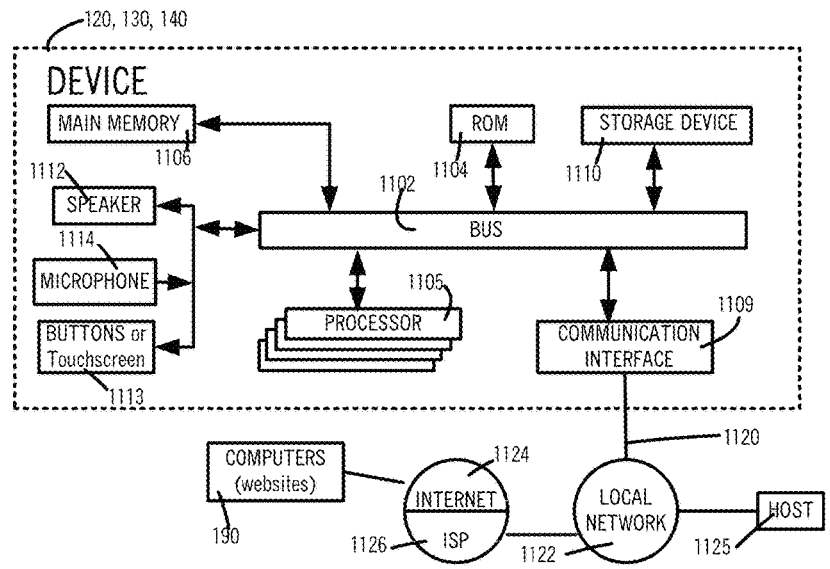
FIG. 6A illustrates, in a block diagram, hardware portions of device 130 that may be configured to perform one or more acts illustrated in FIGS. 2C and 4 in some embodiments.
Figure 6B:
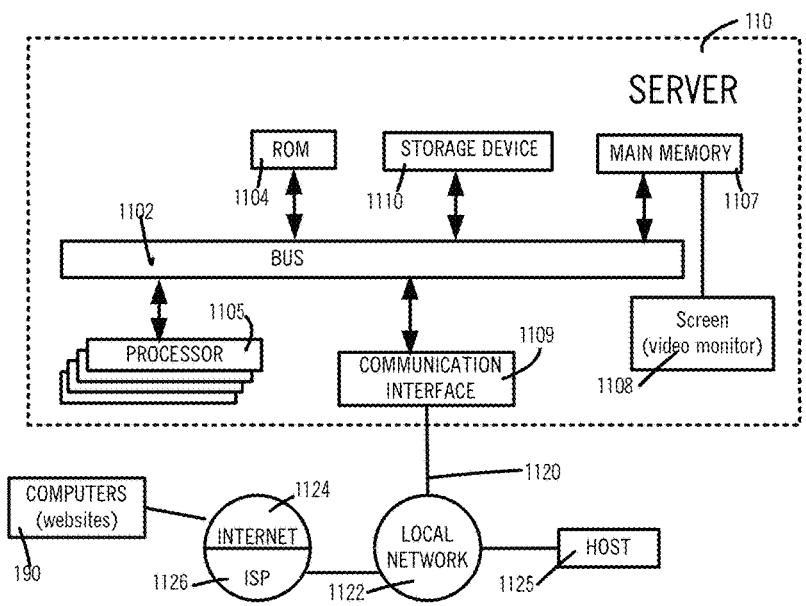
FIG. 6B illustrates, in a block diagram, hardware portions of server 110 that may be configured to perform one or more acts illustrated in FIGS. 2C and 4 in some embodiments.
Figure 6C:
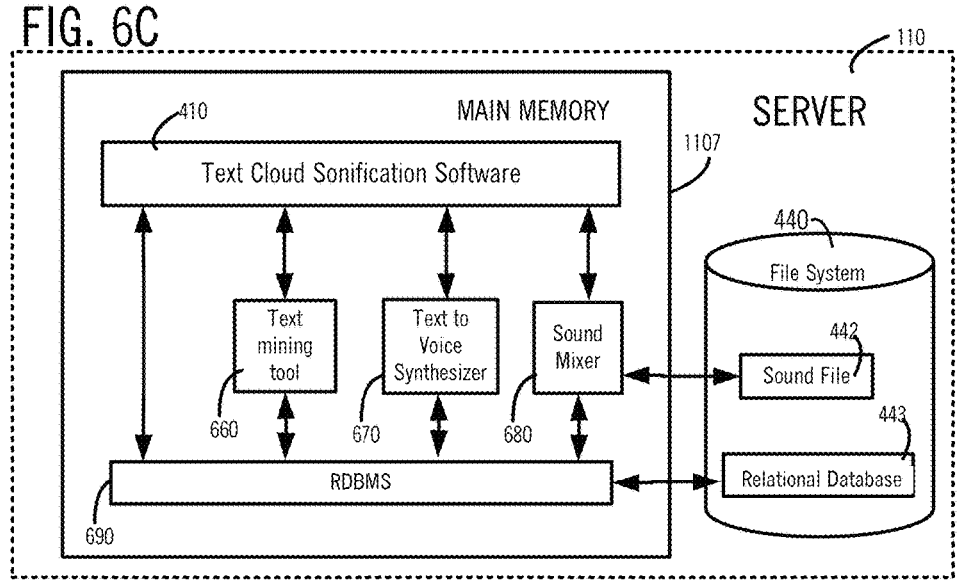
FIG. 6C illustrates, in a block diagram, software portions of server 110 in some embodiments.

Subsequently, in act 217, server 110 creates signals in digital form that represent sounds of each word or phrase spoken (see sounds 311B, 315A and 314B in FIG. 5C), by operating a text-to-speech converter (also called voice synthesizer) 670 in FIG. 6C, wherein each signal includes one or more syllables. The signals may be created in act 217 by recording the sound of each word in table 111 (FIG. 2A) by operating a voice synthesizer. For example, server 110 may operate a voice synthesizer which is available from ReadTheWords. The sound recordings 241 are created in act 217 to have the sound attribute which is associated in act 216 with each word or phrase, and these sound recordings 241 are stored in a non-volatile memory (e.g. hard disk 240 in FIG. 2C), for later use, e.g. in acts 231 and 232. More specifically, in act 217 when the sound attribute is loudness, text-to-speech converter (or voice synthesizer) 670 is operated to speak each word/phrase that occurs in the first column of table 111, and loudness of the word/phrase (of a given row) in table 111 is determined based on a corresponding frequency in the second column (of the given row) in table 111.

In an optional act 218, server 110 may the order of words and/or phrases relative to one another by use of a predetermined method (because, at this stage, words and/or phrases may still be ordered based on their frequency of occurrence as per the second column in the table 111, which is returned by acts 214 and 215). Ordering of words and/or phrases in act 218 may be made, e.g. random relative to one another, implemented for example by using software available from Randomness and Integrity Services Ltd, Premier Business Centres, 8 Dawson Street, Dublin 2, D02 N767, Ireland. And, optionally, in an act 219, server 110 may additionally size spacing (e.g. by including sounds of silence denoting pauses and/or by removing spacing using overlaps) between sound recordings of words and/or phrases in a predetermined manner, e.g. also at random. A positive spacing between sounds of two adjacent words may be implemented in sound file 242 by including an additional sound (e.g. of silence) between the two adjacent words, A negative spacing between two adjacent words may be implemented by starting to play a second sound of the second word (during recordation of sound file 242) even before playing of a first sound of the first word is completed, so that sounds of the first word and the second word overlap one another. Thus, any specific duration, which may be positive or negative, can be inserted between sound recordings words and/or phrases in act 219.

Then, in an act 220, server 110 arranges all sound recordings 241 of words in a temporal sequence relative to one another (e.g. in the order identified by act 218), and outputs them as a single sound file 242. More specifically, in some embodiments that perform randomization in act 218, sound recordings 241 are arranged randomly in sound file 242. In other embodiments, sound recordings 241 may be arranged in any other sequence in sound file 242, e.g. depending on whether or not act 218 is performed. In embodiments wherein act 218 is not performed, sound recordings 241 in sound file 242 may be ordered by occurrence frequency, as per the second column in the table 111. Sound file 242 may be generated by use of a sound editor 680 (e.g., available from Audacity) in act 220. Optionally, in an act 221, server 110 may include a background sound recording 590 (e.g. music) in sound file 242 generated by act 220, followed by act 222 in which sound file 242 is stored on a non-volatile storage medium 240, such as a hard disk.

In some embodiments, the text mining tool 660 and/or the text-to-speech converter 670 and/or sound mixer 680 may be included in (and operated in) a server 110 of the type illustrated in FIG. 2C, and device 120 may receive from server 110, a set of words and phrases in audio form (e.g. a sound file 242) for use in operating the speaker. In alternative embodiments, any one or more of text mining tool 660 and/or text-to-speech converter 670 and/or sound mixer 680 may be included in (and operated in) device 120 (or device 130 or device 140) which has the speaker, and in these embodiments device 120 may include one or more processors (as illustrated in FIG. 6A) capable of executing software of the text mining tool and/or the text-to-speech converter and/or the sound mixer.

Figure 2B:
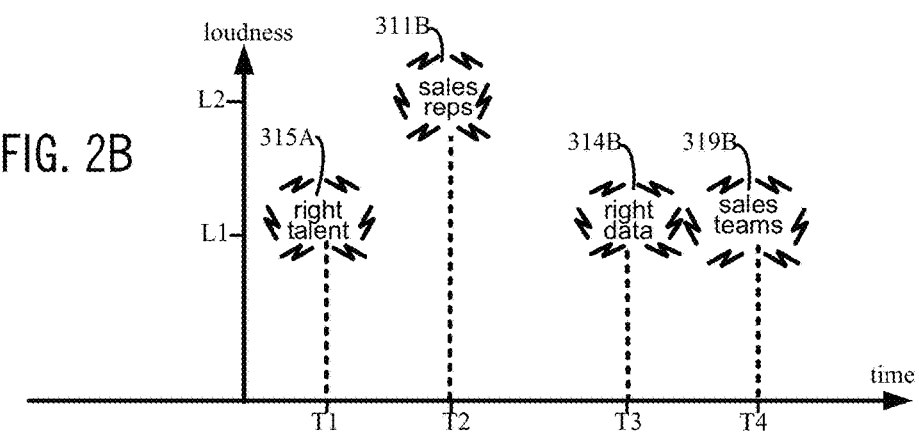
FIG. 2B illustrates, in a graph, one loudness level L2 at which sound 311B (of FIG. 2A) is generated being greater than another loudness level L1 at which sounds 315A, 314B and 319B are generated, by the device 120 of FIG. 2A.

In an example illustrated in FIG. 2B, on playing of sound file 242 in act 232, the phrase 215A (two-word combination "right talent") which is in the 2nd row of table 111 is vocalized into the sound 315A at a time T1 at a loudness level L1. In this example, while continuing to play sound file 242, at a subsequent time T2, the phrase 211B (two-word combination "sales rep") which is in the 3rd row of table 111 is vocalized into the sound 311B at a loudness level L2. Furthermore, also shown in FIG. 2B, the phrase 214A (two-word combination "right data") which is in the 1st row of table 111 is vocalized into the sound 314B at a loudness level L1 at a time T3 which occurs after time T2. Also in this example, at a later time T4, the phrase 219B (two-word combination "sales team") which is in the 4th row of table 111 is vocalized into the sound 319B at a loudness level L1. Hence, in this example, on playing of sound file 242, a sequence of sounds 315A, 311B, 314B and 319B which are emitted from speaker 125 is different (e.g. random) relative to the order of corresponding words/phrases contained in text form (e.g. ASCII or EBCDIC) in table 111

Depending on the embodiment, context, such as current location of user 101, or time of the day, can be used in act 232 to automatically select a sound file 242 containing the spoken form of relevant set of words/phrases to be played by device(s) 120, 130 (FIGS. 2A-2C), as described in an illustrative use case, below.

In certain embodiments, such words/phrases in text form may be categorized into multiple categories by text mining tool 660, as illustrated by categories C1 and C2 in table 112 in FIG. 3A. In such embodiments, corresponding multiple voices and/or accents may be used, as illustrated in FIG. 3B, to indicate via sonification, a specific category of each word/phrase being spoken in the corresponding sounds. Specifically, a voice assignment method (implemented in software) or map 123 (FIG. 3A) is used to assign a first voice V1 to generate sounds 315A and 314B categorized by a first category C1 (e.g. "HCM cloud"), and to assign a second voice V2 to generate sounds 311B and 319B categorized by a second category C2 (e.g. "CRM cloud"). In one embodiment, a method implemented in software 123 which is used, for example, to assign two different voices V1 and V2 to the respective themes "HCM cloud" and "CRM cloud" includes a randomizing engine (described below). In other such embodiments, a map of V1 to "HCM cloud" and V2 to "CRM cloud" is identified by user input (see FIG. 4A), e.g. based on voices supported in text-to-voice synthesizer 670 and based on the categories which are used for categorization (see right-most column in table 112 in FIG. 3A).

As illustrated in FIG. 3B, sounds 315A and 314B are both generated at loudness level L1, and sounds 311B and 319B are generated at loudness levels L2 and L1 respectively. Hence, loudness levels in the embodiment of FIGS. 3A and 3B are identical to loudness levels in the embodiment of FIGS. 2A and 2B (discussed above), while use of multiple voices V1 and V2 in the embodiment of FIGS. 3A and 3B enables user 101 to distinguish between multiple themes.

Figure 3C:
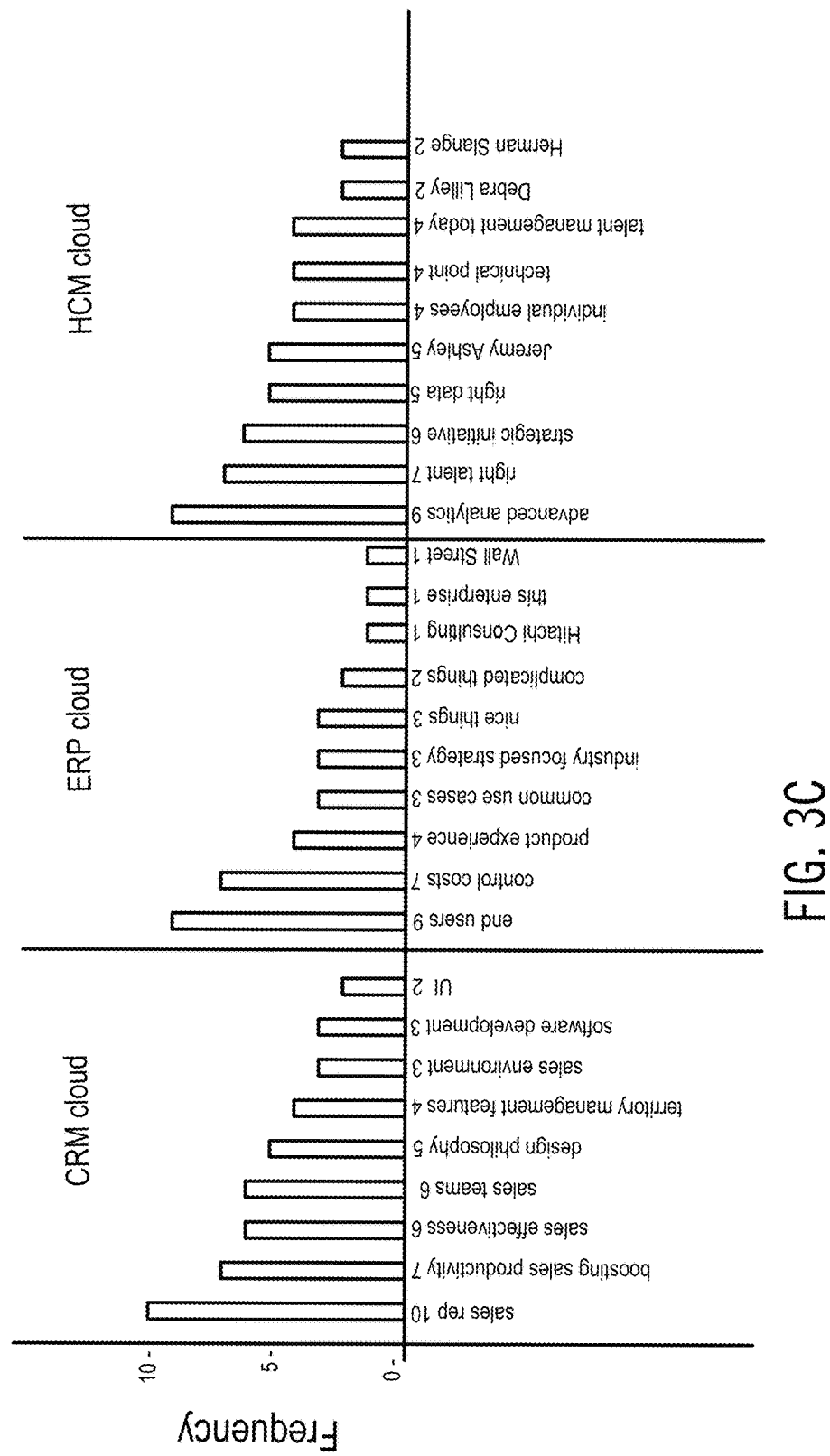
FIG. 3C illustrates in 3 graphs, frequencies of most frequent two-word combinations for three different categories namely, customer relationship management (CRM cloud), enterprise resource management (ERP cloud) and human capital management (HCM cloud).

FIG. 3C illustrates in 3 graphs, frequencies of most frequent two-word combinations for three different categories, customer relationship management (CRM), enterprise resource management (ERP) and human capital management (HCM). Although a table 112 with a third column is shown in FIG. 3A, in other embodiments, multiple two-column tables of the type illustrated in FIG. 2A may be used for multiple categories or themes, as illustrated by tables 210, 220 and 230 in FIG. 5A.

Some embodiments implement logic as illustrated in FIG. 4A, by one or more computer(s) 110 that form a server (hereinafter simply server 110) executing instructions in software 410 (text cloud sonification software), to perform a method in accordance with the invention, as follows. Acts 411-422 of FIG. 4A are similar, although not identical to (and ordered differently relative to) acts 211-222 described above in reference to FIG. 2C, unless otherwise noted below. For example, act 413 corresponds to act 214, act 414 corresponds to act 213, act 416 corresponds to act 217, act 417 corresponds to act 216, etc.

Specifically, in act 411, server 110 receives in user input, one or more themes (information categories) to be presented to the user in audio form. Thereafter, in act 412, server 110 obtains text corpora for all themes, e.g. by retrieving from an internal non-volatile storage device (e.g. hard disk) or from an external non-volatile storage device (e.g. accessible over a local area network or over the Internet), one or more user-identified text(s). Examples of text(s) 433 that are retrieved, for use in being operated on by a text mining tool 660, include documents retrieved from a user-specified directory in the user's PC, and/or user's emails, and/or news feeds to which the user has subscribed, etc. Also, depending on the embodiment, text(s) 433 may be retrieved in act 412 from any websites accessible over the Internet, such as social media websites, e.g. Facebook, Twitter, Instagram, etc. And, text(s) 433 may be retrieved in act 412 from any websites accessible over an intranet, e.g. reports stored on file server(s) of a corporation, which are accessible via a local area network (LAN).

Subsequently, in act 413, server 110 analyzes the user-identified texts (i.e. the text corpora retrieved in act 412), e.g. by submission of the information for analysis of text therein, to a text mining tool 660, which may be, for example, SRM Listen & Analyze Semantic API available from Oracle Corporation. Act 413 may be performed, in some embodiments, as illustrated in FIG. 4B, and described next.

More specifically, as shown in FIG. 4B, server 110 obtains a document in a current category, in act 441. Thereafter, in act 442, the document is parsed, to generate a list of words/phrases and a property of occurrence of each word/phrase in the parsed document (e.g. count or frequency of occurrence). Subsequently, in act 443, server 110 removes from the generated list, every word and/or phrase that is identified in a predetermined set of words that occur commonly (e.g. "the", "he", "she", "any", "there", "still"), to obtain a filtered list. Then, in act 444, server 110 stores the filtered list for the current category in memory. Thereafter, in act 445, server 110 checks if all documents in the current category have been processed and if not returns to act 441 via act 446 in which another document in the current category is obtained. When the answer in act 445 is yes, server 110 merges two or more filtered lists (if there are multiple documents in a category) to obtain an intermediate list in act 447. Thereafter, in act 448, the intermediate list is sorted by server 110 to obtain a table of words and/or phrases and their property of occurrence across all documents in the current category, and stores the table in memory. The above-described acts 441-448 may be repeatedly performed, for other categories, e.g. by checking in act 449 if done with categories, and if not obtaining another category and returning to act 441. When the answer in act 449 is yes, each table in memory is output, as output of act 413.

Figure 5A:
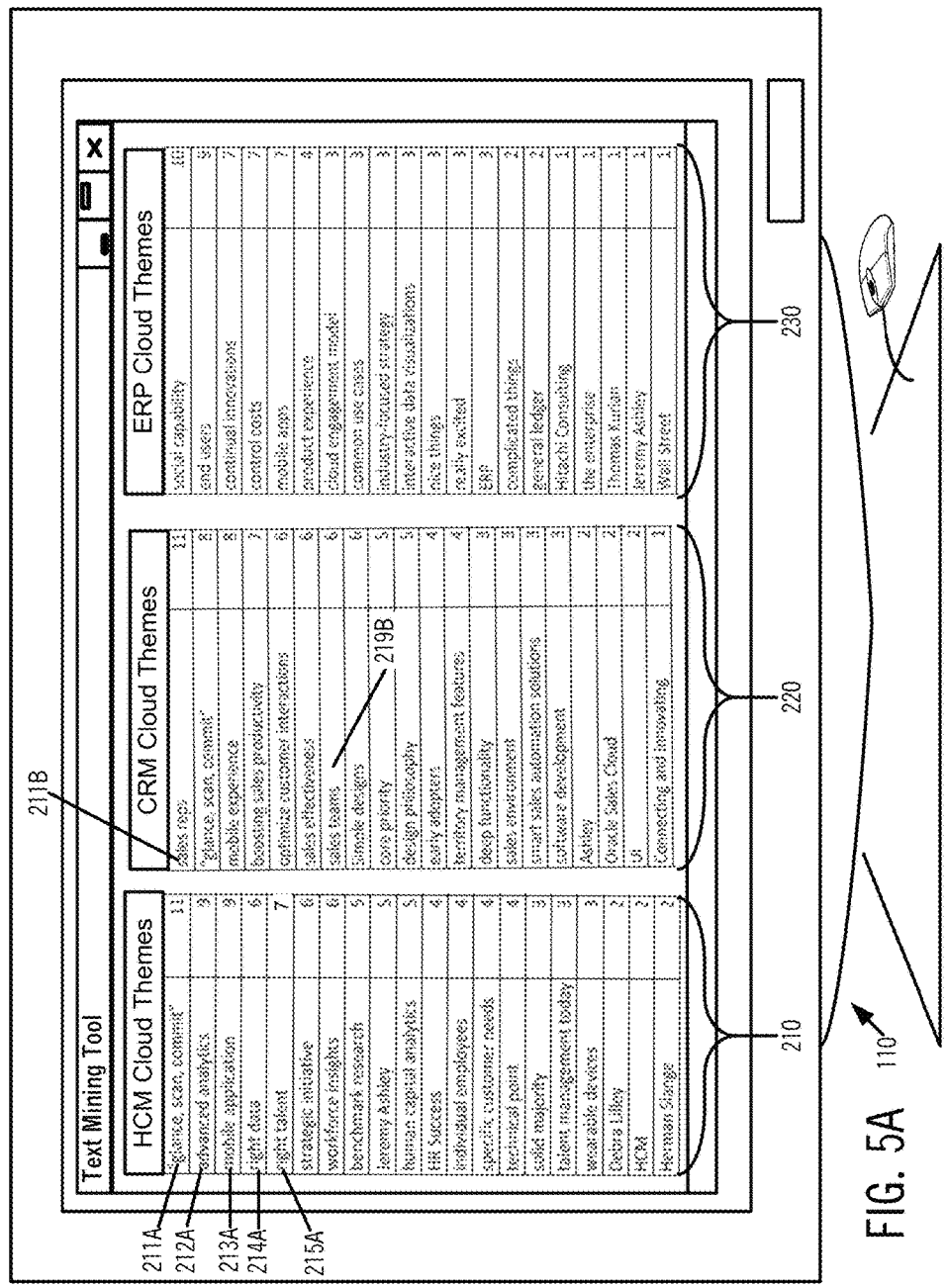
FIG. 5A illustrates three tables 210, 220 and 230 corresponding to the "HCM Cloud" theme, "CRM Cloud" theme, and "ERP Cloud" theme, which are obtained by application of a text mining tool 660 (FIG. 6C) to a user-identified text, as per act 413 in FIG. 4A.

In act 414, which is performed after act 413 described above, server 110 defines a threshold on occurrence count for word frequencies. For example, if top M % (e.g. 10%) of most frequent words have frequencies in between 1000 and 4000, the threshold may be set to 1000 (either automatically, or via user input). Examples of frequencies of top M % (e.g. 20%) of most frequent two-word combinations, may be between 1 and 11 as shown in FIG. 5A. In the example of FIG. 5A, in the theme of CRM, the top 20% of phrases (combinations of two or more words) is between an upper count of 11 and a lower count of 2, and thus a threshold in this example is automatically set to the lower count, namely 2. The lower the threshold defined in act 414, the more words will be included in the sound file 442 to be generated. As noted, this threshold, on inclusion of words/phrases, may be received in user input and/or by use of a predetermined method, or a combination.

Subsequently, in act 415, server 110 uses the threshold M % defined in act 414 to obtain one or more table(s) 111, 112 of most frequent words and phrases resulted from analysis of text, based on a desired threshold, e.g. one table may be obtained for each theme.

Thereafter, in act 416, server 110 records the sound of each word in a table by operating a voice synthesizer. For example, server 110 may operate a voice synthesizer. In certain embodiments, the voice synthesizer is operated in act 416 by using a different voice V1, V2, V3 (not shown in FIG. 3B) for each table obtained in act 415. The sound recordings 441, which are created in act 416, are eventually stored in a non-volatile memory (e.g. hard disk 440 in FIG. 4A), for subsequent use, e.g. in act 420.

Figure 4C:
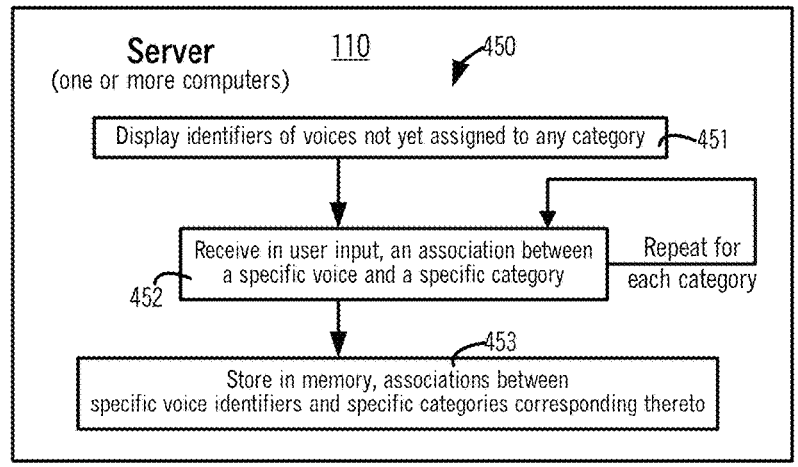
FIG. 4C illustrates, in an intermediate level flow chart, acts performed by one or more processors executing instructions to perform action 416 (FIG. 4A), in certain illustrative embodiments.

Act 416 may be implemented, for example, by performing acts 451-453 of a method 450 illustrated in FIG. 4C. Specifically, in some embodiments, server 110 displays (see act 451) in a user interface (e.g. in a browser), identifiers of voices that have not yet been assigned to any category. For example, server 110 displays icons I1 and I2 that are indicative of voices V1 and V2, and adjacent to each icon is displayed a drop-down list box to receive user input indicative of one of categories C1 or C2 (e.g. "HCM cloud" or "CRM cloud"). Thereafter, in act 452, server 110 receives in user input, an association between an identifier of a specific voice (e.g. V1) and a specific category (e.g. C1). Act 452 is performed repeatedly, until each category has been associated with a corresponding voice. In an act 453, server 110 stores in non-volatile memory (e.g. hard disk 440), the associations 443 which are received in act 452, to identify correspondences between specific voice identifiers V1, V2 and specific categories C1, C2.

After performance of act 416, in an act 417, server 110 associates a volume with each spoken word, based on frequency of occurrence of the word (or count), in the information input to the text mining tool 660. The association between volume and frequency (or count) may be linear or non-linear, depending on the embodiment. A linear method may map a range of upper and lower frequencies (or upper and lower counts) of words output by the text mining tool in act 413 to a range of corresponding loudness levels.

In one illustrative embodiment, act 417 maps the highest frequency or upper-most count (e.g. 11) to the maximum sound level (e.g. 60 dB), and maps the lowest frequency or lower-most count (e.g. 2) to the minimum sound level (e.g. 10 dB), and performs linear interpolation there-between.

Figure 4D:
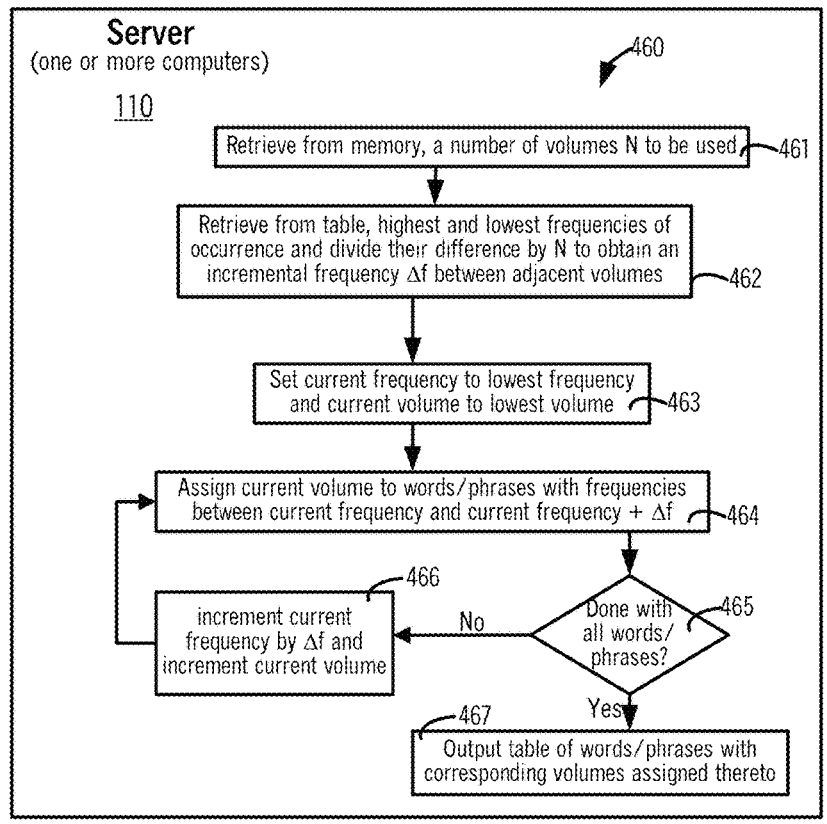
FIG. 4D illustrates, in an intermediate level flow chart, acts performed by one or more processors executing instructions to perform action 417 (FIG. 4A), in certain illustrative embodiments.

Act 417 may be implemented, for example, by performing acts 461-467 of a method 460 illustrated in FIG. 4D. Specifically, in an act 461, server 110 retrieves from memory, a number of volumes N that are to be used. Thereafter, in an act 462, server 110 retrieves from a table 111, 112 of most frequent words and phrases resulted from analysis of text, the highest frequency of occurrence and the lowest frequency of occurrence. For example, values 10 and 6 may be retrieved from table 111, 112. In act 462, a difference between the highest frequency and the lowest frequency is computed, and this difference is divided by number of volumes N, to obtain an incremental frequency Δf between adjacent volumes. Thereafter, in act 463, server 110 sets a current frequency to the lowest frequency and a current volume to the lowest volume, as initialization to enter a loop of acts 464-466. The current volume is assigned in act 464 to all words and/or phrases in table 111, 112 which have frequencies between the current frequency, and the current frequency plus Δf. Then, in act 465, server 110 checks if a volume has been assigned to all words and/or phrases, and if not assigned then server 110 performs act 466. In act 466, the current frequency is incremented by Δf, and the current volume is incremented to the next volume. Thereafter, server 110 returns to act 464. In act 465, if the answer is yes, server 110 goes to act 467 to output the table of words and/or phrases with corresponding volumes assigned thereto.

After performing act 417, in act 418, server 110 randomizes the order of words (which are, at this stage, still ordered by frequency in the table returned by acts 414 and 415). Randomization in act 418 may be performed, for example using software. And, optionally, in an act 419, server 110 may additionally randomize the spacing (e.g. pauses and overlaps) between sound recordings of words.

Then, in an act 420, server 110 arranges all sound recordings 441 of words in a temporal sequence relative to one another (and when act 419 is performed, implements randomized spacing therebetween), and outputs them as a single sound file 442. Thus, in sound file 442, sound recordings 441 are arranged randomly (as determined in act 418), and their volumes are increased (or decreased) to loudness levels identified in act 417. Sound file 442 may be generated by use of a sound editor 680 (e.g., Audacity) in act 420. Optionally, in an act 421 (FIG. 4A), server 110 may include a background sound recording 590 (e.g. music) illustrated in FIG. 5C in sound file 442 generated by act 420, followed by act 422 in which sound file 442 is stored on a non-volatile storage medium 440, such as a hard disk.

Act 420 may be implemented, for example, by performing acts 471-474 of a method 470 illustrated in FIG. 4E. Specifically, in an act 471, server 110 starts recording by sound editor 680. Then in act 472, server 110 plays a recording 441 of a word or phrase, at a corresponding volume associated therewith (e.g. sound 315A is played at volume 4 as illustrated in FIG. 5C). Then server 110 goes to act 473 to check if all sound recordings of words and/or phrases have been played, and if no returns to act 472. If the answer in act 473 is yes, then server 110 goes to act 474 to output a recording (which is being made by performing act 471), in a single sound file 442.

After file 442 is created, in act 431 the sound file 442 is retrieved from the non-volatile storage medium 440 by user's device 130 (which includes a speaker 135), and in act 432 the sound file 442 is played by device 130 when a predetermined event occurs, for example, on receipt of the user's input via a microphone in device 130, e.g. in response to the user's voice request "Alexa, what's my briefing?". Alternatively, device 130 may be configured to play sound file 442 at a specific time and/or when device 130 determines that the user is at a specific location, for example, each day when the user first enters their office in the morning (or evening, if night shift).

FIG. 5A illustrates multiple tables 210, 220 and 230 output by operation of a text mining tool 660 in act 413, for corresponding multiple categories, namely "HCM cloud", "CRM cloud" and "ERP cloud." In some embodiments, each of these multiple categories are identified in user input, into which the text mining tool 660 classifies the words/phrases found in the information retrieved in act 412 (FIG. 4A). In alternative embodiments, the information retrieved in act 412 may be already classified into these multiple categories (e.g. by corresponding multiple webpages and sub-pages, at the website of Oracle Corporation), in which case user input is not needed to identify the multiple categories.

Figure 5B:
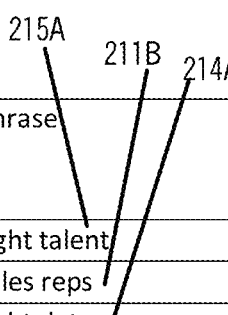
FIG. 5B illustrates a table including phrases of three tables of FIG. 5A arranged into a single sequence in which the phrases are spoken, by execution of text cloud sonification software 410 in some illustrative embodiments.

As illustrated in the table of FIG. 5B, the phrases of the three tables 210, 220 and 230 are combined into a single sequence in which the phrases are spoken, in some embodiments. Specifically, words are randomized in FIG. 5B and assigned a sequence number. This table is used to operate a text-to-voice synthesizer 670 by use of three different voices for the three themes, with the loudness determined by count of occurrence (or frequency). The sounds output by the text-to-voice synthesizer 670 in multiple tracks 511-521 are assembled by operation of sound editor (also called sound mixer) 680 with optional background music track 590 in a time order according to the sequence number and stored in sound file 442 which is eventually played via a speaker 125/135 to the user.

In some embodiments, the list of words are processed through a randomizing engine a second time to randomize pauses between words, which are used to generate a sound file 442. In some embodiments, to simulate ambience of an exposition hall, the sounds may be made to overlap (e.g. by use of negative values for pauses between words) in sound file 442. The sounds output by the text-to-voice synthesizer 670 are initially organized into tracks, with one track for all Volume 1 sounds, and another track for all Volume 2 sounds, and so on. The track headers are labeled "Volume #X" as shown in FIG. 5C.

FIG. 5C illustrates use of an audio editor (also called sound editor or sound mixer) 680 to perform act 420, on sound recordings 441 generated in act 416 by operation of a text to voice synthesizer 670 on the multiple tables 210, 220 and 230 of FIG. 5A. The top sound track 521 in FIG. 5C is called "volume 11", and its volume is set to 60 dB, and all words with frequency or upper count of 11 (e.g. highest frequency or upper-most count, as described above in a paragraph referencing US Department of Labor documentation) are included in this track 521. The bottom sound track 511 in FIG. 5C is labeled "volume 1" its volume is set to 10 dB, and all words with lowest frequency or lower-most count of 2 belong to this track 511.

Hence, in the illustrative example, the phrase "right talent" 215A in FIG. 5B is vocalized by text to voice synthesizer 670 into a sound 315A at volume 4 (as per loudness assignment method/map 122) and included in sound track 514 (in FIG. 5C) using a first voice V1 (which is assigned to vocalize words in the HCM cloud as per a voice assignment method/map 123 as shown in FIG. 3A).

Similarly, the phrase "sales reps" 211B in FIG. 5B is vocalized into the sound 311B at volume 7 (as per loudness assignment method/map 122) and included in sound track 517 (in FIG. 5C) using a second voice V2 (which is assigned to vocalize words in the CRM cloud as per the voice assignment method/map 123 shown in FIG. 3A). Hence, in this example, the phrase "right data" 214A in FIG. 5B is vocalized into the sound 314B at volume 2 in sound track 512 (in FIG. 5C) using the first voice (which is assigned to the HCM cloud).

Figure 5D:
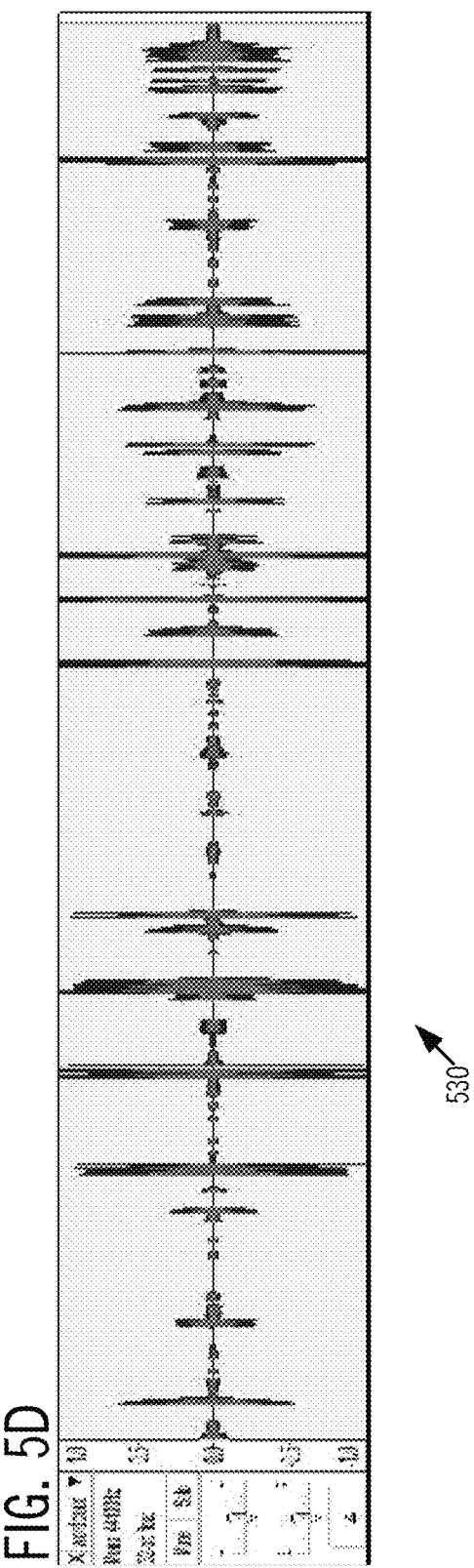
FIG. 5D illustrates a single track 530 stored in a sound file 442 generated by audio editor of FIG. 5C, by combining sound recordings 441 (FIG. 5C) which includes multiple tracks 511-521 at respective loudness levels volume 1-volume 11, excluding track 590 (background music).

In this manner, all the phrases and/or words in table 112 are vocalized into sounds (using respective voices V1, V2 which are assigned to corresponding themes or categories HCM Cloud, CRM Cloud). The audio editor 680 is then operated to assemble sound tracks 511-521 into a single track 530 (in FIG. 5D) which is stored in hard disk 440 (FIG. 4A) as a single sound file 442 (and in the example of FIG. 5D, track 530 and sound file 442 do not include optional background music track 590). Sound file 442 is retrieved a device 120/130 and played on a speaker 125/135, as per acts 431 and 432 in FIG. 4A.

In one illustrative use case, a user works at ABC company, as its Brand Manager. ABC Company allows customers to influence its brands, via conversations on social media. Hence, the Brand Manager stays informed, on the most relevant themes in social media. To do so, the Brand Manager may see themes extracted from social media conversations, and presented visually in the form of a text cloud, as shown in FIG. 1.

However, if the user happens to be walking or driving, or if the user needs their screen space for something else, or if the user's device has no screen, the user has a new option, specifically, listen to a sound file 442 (FIG. 4A) containing sonification of themes (which may be extracted by use of a text mining tool 660 on conversations in social media, as noted above). In this illustrative use case, playing of sound file 442 on any wearable device, or on a laptop may be requested in any public space (e.g. building lobby). Alternatively or additionally, the user may make the same request in a car, or on a smartphone, or on any sound-enabled device 130 on to which sound file 442 can be loaded. For example, while driving to an event, to hear today's themes in social media conversations, the user may say to a voice assistant in their smartphone, such as iPhone available from Apple Corporation, "Siri, what's my briefing?"

In response to the user's request, an application (also called "app") in the user's smartphone may determine from the user's calendar that the user is currently driving to a specific event, and accordingly decide to play a sound file 442 that includes words/phrases obtained by analysis of information pertaining to that specific event by a text mining tool 660, which information may be retrieved from one or more news sites, or social media, e.g. Facebook, Twitter, Instagram, etc.

In this example, when sound file 442 is played, the user may hear that trending themes are Labor, Working Conditions, and Environment, which the user may then use in speaking at the event, e.g. the user may state that all products of ABC company are Fair Trade certified.

In this illustrative use case, on returning to their office on the next day, the user may ask Amazon Echo, again simply to provide a briefing. Knowing that the user is now in the office, and next to his computer, Amazon Echo may play another sound file 442 that includes words/phrases obtained by analysis, e.g. by using a text mining tool 660 on reports on the results of ABC company's most-recent campaign in social media. When this second sound file 442 is played, the user may hear the words Supply Shortage and Waitlist. In response, the user may contact warehouse managers, to request that deliveries be expedited (in order to address themes in the reports).

Accordingly, embodiments that perform text cloud sonification, as illustrated in one or more of FIGS. 2A-2C, 4, and 5A-5D are examples of multidimensional, analytical information being communicated to the user exclusively via an audio interface, in an intuitive way. The embodiments illustrated in one or more of FIGS. 2A-2C, 4, and 5A-5D improve over prior solutions, which appear to communicate simple information (like an alert message), or are too complex to be decoded by a user without prior training. Hence, embodiments illustrated in one or more of FIGS. 2A-2C, 4, and 5A-5C provide usable interfaces for wearable devices, including smart watches, and IoT including smart office, smart home, and smart car.

In some embodiments, a device 120, 130, 140 that retrieves and plays sound file 442 to user 101 (FIGS. 2A, 2C) is a mobile device, such as a smartphone and/or other electronic device (e.g. a watch) that contains a speaker 1112 (FIG. 6A). Depending on the embodiment, device 120, 130, 140 may optionally include a microphone 1114 and/or buttons 1113 which receive input from user 101 and supply the user input to one or more processors 1105 also included in device 120, 130, 140. The above-described server 110 (FIG. 4A) includes hardware components that are similar to (although larger in size than) corresponding hardware components included in device 120, 130, 140. Hence, such similar hardware components are shown in common in FIG. 6A, wherein dashed box 110 identifies hardware components of the server, and dashed box 120, 130, 140 identifies hardware components of the device.

Depending on the embodiment, processors 1105 may be programmed to perform one or more or all of acts 411-422 and/or 431, 432 illustrated in FIG. 4A in whole or in part, and in any combination with one or more hardware components of server 110. As noted above, depending on the embodiment, server 110 may itself be programmed to perform one or more or all of acts 411-422 and/or 431, 432 illustrated in FIG. 4A, and in these embodiments, a main memory 1107 (FIG. 6B) of server 110 includes software described above, namely text cloud sonification software 410, text mining tool 660, text to voice synthesizer 670, and sound mixer 680. Main memory 1107 may additionally include a relational database management system 690.

In some embodiments, each of devices 120, 130, 140 and server 110 includes a bus 1102 (FIG. 6A) or other communication mechanism for communicating information, and one or more processor(s) 1105 coupled with bus 1102 for processing information. Each of devices 120, 130, 140 uses a main memory 1106 whereas server 110 uses a main memory 1107. Main memory 1106, 1107 may be, for example, a random access memory (RAM) or other dynamic storage device, or any non-transitory computer readable storage media coupled to bus 1102 for storing information and instructions to be executed by processor(s) 1105 (e.g. to perform acts 411-422 and/or 431, 432 of FIG. 4A).

Main memory 1106, 1107 (FIG. 6A) also may be used for storing temporary variables or other intermediate information during execution of instructions (e.g. in components 410, 660, 670, 680, 690 illustrated in FIG. 6C) by processor(s) 1105. Each of devices 120, 130, 140 and server 110 further includes a read only memory (ROM) 1104 or other static storage device coupled to bus 1102 for storing static information and instructions for processor 1105, such as software in the form of a browser. A storage device 1110, such as a magnetic disk or optical disk, is provided and coupled to bus 1102 for storing information and instructions.

Each of devices 120, 130, 140 may be coupled via bus 1102 to a speaker 1112 for creating sounds that can be heard by a user (e.g. user 101). Moreover, a microphone 1114 is coupled to bus 1102 for communicating voice commands received as user input (e.g. from any user 101) to processor 1105. Another type of user input device includes buttons or a touchscreen 1113 for communicating user selections to processor 1105. A touchscreen, when included in device 120, 130, 140, typically provides two degrees of freedom in two axes, a first axis (e.g., x) and a second axis (e.g., y), that allows the user to specify positions in a plane. In addition to speaker 1112 on which generates sound, devices 120, 130, 140 and server 110 may include a display or screen (not shown) as another output device, for use by processor 1105 in interacting with any user(s) (such as user 101).

As described elsewhere herein, execution of text cloud sonification software 410 (FIG. 4A) in server 110 (FIGS. 6B, 6C) may be implemented by one or more processor(s) 1105 executing one or more sequences of one or more instructions that are contained in main memory 1107. Such instructions may be read into main memory 1107 from another non-transitory computer readable storage medium, such as storage device 1110. Execution of the sequences of instructions contained in main memory 1107 causes processor 1105 to create and store a sound file 442 as illustrated in FIG. 4A. In alternative embodiments, hard-wired circuitry may be used in place of or in combination with software instructions in text cloud sonification software 410, to perform one or more act(s) illustrated in FIG. 4A.

The term "non-transitory computer readable storage media" as used herein refers to any non-transitory storage media that store information in any non-transitory manner, and may be configured to provide to processor 1105, a plurality of instructions for execution. One or more such non-transitory storage media may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by server 110. Volatile storage media includes dynamic memory, such as main memory 1106 or main memory 1107 which may be implemented in the form of a random access memory or RAM.

Instructions to processor 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a remote computer 190 (FIG. 6A). The remote computer can load the instructions into its dynamic memory (RAM) and send the instructions over a telephone line using a modem.

A modem local to device 120, 130, 140 can receive information about a change to a sound file 442 via the telephone line or a cellular wireless link, or via a Bluetooth wireless link. Some embodiments of server 110 may use an infra-red transmitter to transmit the sound file 442 in an infra-red signal. An infra-red detector in device 120, 130, 140 can receive the sound file 442 carried in the infra-red signal and appropriate circuitry can place the information on bus 1102 (FIG. 6A). Bus 1102 carries the information to main memory 1106, from which processor 1105 retrieves sound file 442 and operates the speaker 1112 to play sounds that are audible to user 101. Any software and/or data, such as sound file 442, which is stored in main memory 1106 may optionally be stored on storage device 1110 either before or after execution by processor 1105.

Each of devices 120, 130, 140 and server 110 includes a communication interface 1109 (FIG. 6A) coupled to bus 1102. Communication interface 1109 provides a two-way data communication coupling to a network link 1120 that is connected to a local network 1122. Local network 1122 may interconnect multiple computers (as described above). For example, communication interface 1109 may be an integrated services digital network (ISDN) card or a modem to provide a data communication connection to a corresponding type of telephone line. As another example, communication interface 1109 may be a local area network (LAN) card to provide a data communication connection to a compatible LAN. Wireless links may also be implemented. In any such implementation, communication interface 1109 sends and receives electrical, electromagnetic or optical signals that carry digital data streams representing various types of information.

Network link 1120 (FIG. 6A) typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1109, which carry the digital data to and from devices 120, 130, 140 and server 110 are exemplary forms of carrier waves transporting the information.

Each of devices 120, 130, 140 and server 110 (FIG. 6A) can send messages and receive data, including program code, through the network(s), network link 1120 and communication interface 1109. In the Internet example, server 110 might transmit through Internet 1124, ISP 1126, local network 1122 and communication interface 1109, any given information (which may need to be analyzed, e.g. by text mining tool 660) after retrieval of the information by execution of relational database management system 690 (FIG. 6C) on a relational database that is stored non-transitorily, e.g. in non-volatile storage media, such as hard disk 440. One or more instructions for performing the acts of FIG. 4A may be executed by processor 1105 as they are received, and/or stored in storage device 1110, or other non-volatile storage for later execution. In this manner, devices 120, 130, 140 and server 110 may additionally or alternatively obtain instructions and any related data.

FIG. 6A is a very low-level representation of many hardware components of one or more of devices 120, 130, 140 and server 110 described above in reference to FIGS. 2A-2C, 4, and 5A-5C. As noted above, server 110 of several embodiments have software components 410, 660, 670, 680 and 690 in main memory 1107, as shown in FIG. 6C. Also, devices 120, 130, 140 and server 110 may include one or more other types of memory such as flash memory (or SD card) and/or a hard disk and/or an optical disk (also called "secondary memory") to store data and/or software for loading into memory 1106 or memory 1107 and/or for use by processor(s) 1105. In some embodiments, server 110 may implement a relational database management system 690 (FIG. 6C) to manage data in one or more tables of a relational database 443 of the type illustrated in FIG. 6C. Such a relational database management system may manage a distributed database system that includes multiple databases, each table being stored on different storage mechanisms.

In some embodiments, the multiple databases are made to appear as a single database. In such embodiments, processor 1105 can access and modify the data in a relational database 443 via RDBMS 690 (FIG. 6C) that accepts queries from various software components 410, 660, 670 and 680 in conformance with a relational database language, the most common of which is the Structured Query Language (SQL). The commands are used by processor 1105 of some embodiments to store, modify and update tables 111 and 112 (FIGS. 2A, 3A) in the form of relational tables (which may additionally contain one or more indexes pointing to other relational tables) in relational database 443.

Relational database management system 690 (FIG. 6C) further includes output logic that makes the data in a database table of relational database 443 available to a user via a graphical user interface that generates a display on a screen 1108 (FIG. 6B) of server 110, such as the screens illustrated in FIG. 5A. In one example, the output logic of one or more of components 410, 660, 670, 680 and 690 provides output visually, via a web-based user interface that depicts in a browser of another computer, information related to words and phrases and/or corresponding sounds thereof which are eventually included in sound file 442. Additionally and/or alternatively, screens responsive to user input via a keyboard as a command in a command-line interface of server 110 and/or user input via a mouse and a cursor displayed on a video monitor or screen 1108 may be generated by server 110.

In some embodiments of one or more of devices 120, 130, 140 and server 110, functionality in the above-described operations or acts of FIG. 4A is implemented by processor 1105 (FIG. 6A) executing software in memory 1106 or memory 1107, although in other embodiments such functionality is implemented in any combination of hardware circuitry and/or firmware and/or software in one or more of devices 120, 130, 140 and server 110. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIG. 4A can, but need not necessarily include, one or more microprocessors, embedded processors, controllers, application specific integrated circuits (ASICs), digital signal processors (DSPs), multi-core processors and the like, appropriately programmed with software in the form of instructions to implement one or more steps of the type described herein.

Any non-transitory computer-readable medium tangibly embodying software (also called "computer instructions") may be used in implementing one or more acts or operations described herein and illustrated in FIG. 4A. Such software may include program codes stored in memory 1106 or memory 1107 and executed by processor 1105 (FIG. 6A). Memory 1106 or memory 1107 may be implemented within or external to processor 1105, depending on the embodiment. When implemented in firmware and/or software, logic to perform one or more acts or operations of FIG. 4A may be stored as one or more computer instructions or code on a non-transitory computer-readable medium.

In some embodiments, one or more of devices 120, 130, 140 and server 110 may include multiple processors, each of which is programmed with software in a memory 1106 or memory 1107 shared with each other to perform acts of the type described above to implement the individual components illustrated in FIG. 4A. For example, a first processor 1105 in devices 120, 130, 140 and server 110 may be programmed with software in memory 1106 or memory 1107 to implement acts 411-415 of FIG. 4A in one component. A second processor 1105 in one or more of devices 120, 130, 140 and server 110 may be programmed with software in memory 1106 or memory 1107 (FIG. 6A) to implement act 416 of FIG. 4A in a second component. A third processor 1105 in one or more of devices 120, 130, 140 and server 110 may be programmed with software in memory 1106 or memory 1107 (FIG. 6A) to implement acts 417-422 of FIG. 4A in a third component.

Although three processors 1105 (FIG. 6A) have been just described for some embodiments to implement the respective components, in other embodiments a single processor 1105 may be used in a time shared manner to implement the just-described components of the previous paragraph. For example, a server 110 that executes text cloud sonification software 410 may also execute text mining tool 660, text to voice synthesizer 670 and sound mixer 680 described above. Such a server 110 may be programmed to perform any one or more of acts described above in reference to FIG. 4A. Moreover, in such embodiments, one processor 1105 may be used in a time-shared manner to implement one or more parts of various components of the type described herein. Furthermore, although multiple processors 1105 for certain embodiments are included in a single computer, in other embodiments multiple such processors 1105 may be included in multiple computers, for example three computers 110 may implement acts 411-415 of FIG. 4A in one computer, and act 416 in a second computer, and acts 417-422 of FIG. 4A in a third computer. A fourth computer may contain database 443 of some embodiments. Database 443 may be implemented as a relational database which is accessible by executing software of a relational database management system (RDBMS), 690, such as Oracle 11gR2 available from Oracle Corporation of Redwood Shores, Calif.

In some embodiments, a method to improve delivery of information to a user includes one or more computers operating a text mining tool on the information, to obtain a plurality of words and/or phrases occurring in the information and a frequency of occurrence of each word or phrase in the information, associating multiple words and/or phrases in the plurality of words and/or phrases, with multiple loudness levels corresponding thereto, by using a loudness assignment method or map based on the frequency of occurrence in the information, said one or more computers creating multiple signals that represent sounds of the multiple words and/or phrases being spoken at the multiple loudness levels, by at least operating a text-to-speech converter; and said one or more computers storing in non-transitory memory, a file comprising the multiple signals, the multiple signals being arranged in the file in a single sequence that is different relative to ordering of the multiple words and/or phrases in the information.

Various adaptations and modifications may be made without departing from the scope of the described embodiments. Numerous modifications and adaptations of the embodiments described herein are encompassed by the attached claims.

The invention claimed is:

1. A method to improve delivery of information to a user, the method comprising:
   receiving from the user, input indicative of a plurality of themes and locations of a plurality of documents;
   one or more computers operating a text mining tool repeatedly for each theme in said plurality of themes, to obtain at least: (a) a plurality of words and/or phrases occurring in the plurality of documents, (b) a frequency of occurrence across a group of documents on a theme, of at least one word or phrase in the plurality of words and/or phrases, and (c) for said at least one word or phrase, said theme;
   associating one or more words or phrases in the plurality of words and/or phrases, with one or more loudness levels determined from among a plurality of loudness levels based on the frequency of said one or more words or phrases, by using a loudness assignment method or map;
   said one or more computers creating multiple signals that represent sounds of corresponding multiple words and/or phrases being spoken at loudness levels associated therewith using a plurality of voices determined based on corresponding themes of the multiple words and/or phrases, by at least operating a text-to-speech converter;
   arranging the multiple signals relative to one another in a single sequence that is different relative to ordering of the corresponding multiple words and/or phrases in the plurality of documents; and
   said one or more computers storing in non-transitory memory, a file comprising the multiple signals arranged in the single sequence for use in informing to said user, at least said corresponding themes of the multiple words and/or phrases.

2. The method of claim 1 further comprising:
   retrieving at least one or more document(s) in the plurality of documents from at least one social media website accessible to the user over the Internet, at a location identified by the input received from the user.

3. The method of claim 1 wherein said input is first input, the first input comprises a specific theme C1, and the method further comprising:
   said one or more computers displaying identifiers of voices; and
   said one or more computers receiving in second input from the user, an association between an identifier V1 of a specific voice to be used to vocalize words or phrases in a specific group of one or more document(s) on the specific theme C1 indicated in the first user input.

4. The method of claim 1 wherein:
   said arranging arranges the words and/or phrases obtained by the operating, in a random order relative to one another; and
   in the file stored in the non-transitory memory, the multiple signals representing the words and/or phrases are ordered randomly relative to one another.

5. The method of claim 1 wherein:
   said arranging arranges at least two signals representing the words and/or phrases in the single sequence which are adjacent to one another to have a negative spacing therebetween so that a second sound of a second word starts before playing of a first sound of a first word completes, and a duration of the negative spacing is determined at random.

6. The method of claim 1 wherein:
   the words and/or phrases are comprised in a first column of a table output by the text mining tool;
   a second column of the table comprises said frequency of said each word or phrase;
   a third column of the table identifies the theme of said each word or phrase; and
   the method further comprises said one or more computers removing a set of common words and applying a threshold to said frequency to obtain the plurality of words and/or phrases.

7. The method of claim 1 wherein:
   a specific word or phrase is selected for inclusion among the plurality of words and/or phrases obtained by the operating, at least based on the specific word or phrase being included in most-frequently occurring M % of words and/or phrases in said group, wherein M is a constant.

8. The method of claim 1 wherein:
   the loudness level changes as a function of the frequency of said each word or phrase in the group such that a word or phrase occurring at a highest frequency in each group is mapped to a maximum sound level used commonly for multiple groups.

9. The method of claim 1 wherein:
   the plurality of documents are retrieved from at least a social media website accessible to the user over the Internet and a newsfeed subscribed by the user.

10. One or more computers comprising:
    one or more processors;
    memory operatively coupled to the one or more processors; and
    software stored in the memory that when run in the one or more processors, causes the one or more processors to:
    receive from a user, input indicative of a plurality of themes and locations of a plurality of documents;
    operate at least a text mining tool repeatedly for each theme in said plurality of themes, to obtain at least: (a) a plurality of words and/or phrases occurring in the plurality of documents, (b) a frequency of occurrence across a group of documents on a theme, of at least one word or phrase in the plurality of words and/or phrases, and (c) for said at least one word or phrase, said theme;
    associate one or more words or phrases in the plurality of words and/or phrases, with one or more loudness levels determined from among a plurality of loudness levels based on the frequency of said one or more words or phrases, by using a loudness assignment method or map;
    create multiple signals that represent sounds of corresponding multiple words and/or phrases being spoken at loudness levels associated therewith using a plurality of voices determined based on corresponding themes of the multiple words and/or phrases, by at least operating a text-to-speech converter;
    arrange the multiple signals relative to one another in a single sequence that is different relative to ordering of the corresponding multiple words and/or phrases in the plurality of documents; and store in said memory, a file comprising the multiple signals arranged in the single sequence for use in informing to said user, at least said corresponding themes of the multiple words and/or phrases.

11. One or more non-transitory computer-readable storage media and stored thereon software which when run in one or more processors, causes the one or more processors to:
operate at least a text mining tool repeatedly for each theme in a plurality of themes, to obtain at least: (a) a plurality of words and/or phrases occurring in a plurality of documents, (b) a frequency of occurrence across a group of documents on a theme, of at least one word or phrase in the plurality of words and/or phrases, (c) for said each word or phrase, said theme;
associate one or more words or phrases in the plurality of words and/or phrases, with one or more loudness levels determined from among a plurality of loudness levels based on the frequency of said one or more words or phrases, by using a loudness assignment method or map;
create multiple signals that represent sounds of corresponding multiple words and/or phrases being spoken at loudness levels associated therewith using a plurality of voices determined based on corresponding themes of the multiple words and/or phrases, by at least operating a text-to-speech converter;
arrange the multiple signals relative to one another in a single sequence that is different relative to ordering of the corresponding multiple words and/or phrases in the plurality of documents; and
store in a memory, a file comprising the multiple signals arranged in the single sequence for use in informing to a user, at least said corresponding themes of the multiple words and/or phrases.

12. The one or more non-transitory computer-readable storage media of claim 11 wherein the software causes the one or more processors to:
display identifiers of voices not yet assigned to any group; and
receive in user input, identifier of a specific voice to be used to vocalize words or phrases of said group.

13. The one or more non-transitory computer-readable storage claim 11 wherein the software causes the one or more processors to:
arrange between words and/or phrases, spacing of silence of random duration.

14. The one or more non-transitory computer-readable storage media of claim 11 wherein the software causes the one or more processors to:
retrieve at least one or more document(s) in the plurality of documents from at least one social media website accessible to the user over the Internet, at a location identified by the input received from the user.

15. The one or more non-transitory computer-readable storage media of claim 11 wherein said input is first input, the first input comprises a specific theme C1, and the software causes the one or more processors to:
display identifiers of voices; and
receive in second input from the user, an association between an identifier V1 of a specific voice to be used to vocalize words or phrases in a specific group of one or more document(s) on the specific theme C1 indicated in the first user input.

16. The one or more non-transitory computer-readable storage media of claim 11 wherein the software that causes the one or more processors to arrange:
arranges the words and/or phrases obtained by operation of the text mining tool, in a random order relative to one another; and
in the file stored in the non-transitory memory, the multiple signals representing the words and/or phrases are ordered randomly relative to one another.

17. The one or more non-transitory computer-readable storage media of claim 11 wherein the software that causes the one or more processors to arrange:
arranges at least two signals representing the words and/or phrases in the single sequence which are adjacent to one another to have a negative spacing therebetween so that a second sound of a second word starts before playing of a first sound of a first word completes, and a duration of the negative spacing is determined at random.

18. The one or more non-transitory computer-readable storage media of claim 11 wherein:
the words and/or phrases are comprised in a first column of a table output by the text mining tool;
a second column of the table comprises said frequency of said each word or phrase;
a third column of the table identifies the theme of said each word or phrase; and
the software causes the one or more processors to remove a set of common words and apply a threshold to said frequency to obtain the plurality of words and/or phrases.

19. The one or more non-transitory computer-readable storage media of claim 11 wherein:
a specific word or phrase is selected for inclusion among the plurality of words and/or phrases obtained by operation of the text mining tool, at least based on the specific word or phrase being included in most-frequently occurring M % of words and/or phrases in said group wherein M is a constant.

20. The one or more non-transitory computer-readable storage media of claim 11 wherein:
the loudness level changes as a function of the frequency of said each word or phrase in the group such that a word or phrase occurring at a highest frequency in each group is mapped to a maximum sound level used commonly for multiple groups.

* * * * *

UNITED STATES PATENT AND TRADEMARK OFFICE
CERTIFICATE OF CORRECTION

Page 1 of 1

PATENT NO. : 10,235,989 B2
APPLICATION NO. : 15/265836
DATED : March 19, 2019
INVENTOR(S) : Blyumen It is certified that error appears in the above-identified patent and that said Letters Patent is hereby corrected as shown below:

In the Specification

In Column 6, Line 33, after "111" insert -- . --.

In the Claims

In Column 19, Line 43, in Claim 13, after "storage" insert -- media of --.

In Column 20, Line 47, in Claim 19, after "group" insert -- , --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*